Sept. 5, 1961

H. H. WIESE 2,998,744

OPTICAL SIGHT

Filed April 13, 1959

INVENTOR.
HAROLD H. WIESE
BY

United States Patent Office 2,998,744
Patented Sept. 5, 1961

2,998,744
OPTICAL SIGHT
Harold H. Wiese, Davenport, Iowa, assignor to the United States of America as represented by the Secretary of the Army
Filed Apr. 13, 1959, Ser. No. 806,198
4 Claims. (Cl. 88—1)

The present invention relates to an optical sight, and more particularly to a sight of the type in which an illuminated reticle is projected as an image upon a semi-transparent mirror through which an observer views a target.

In sights of this kind which are employed on guns or other items of ordnance, it is necessary to provide for adjusting the sight for alignment with the ordnance item it is associated with. In a gun sight of this type, orientation of the sight to the gun is accomplished by first bore sighting the gun on a distant target and then adjusting the sight to make the reticle image coincide with that target, in a manner well known in the art. For some applications, it is expedient to arrange the sight so that only the combining glass through which the observer views the target moves, the remainder of the sight components being stationary. In these sights, the combining glass is rotated about a vertical axis as a result of which, the reticle image becomes inclined as the glass is moved angularly with respect to the line of sight of the observer. Inclination of the reticle image in this manner is objectionable and interposes a problem insofar as tracking a target is concerned.

It is, therefore, a primary object of the present invention to provide an improvement for gun sights of the type referred to above.

It is also an object of the present invention to provide a suitable means for automatically correcting image lean in a gun sight.

It is a further object of the present invention to provide a simple and effective arrangement for correcting image lean for gun sights.

Still further it is an object of the present invention to provide an arrangement for correcting image lean in a gun sight which is highly efficient in operation, relatively simple in construction and which is universally applicable to gun sights of the type utilizing a semi-transparent mirror for combining a reticle image with the field of view of an observer.

In accordance with the present invention, an arrangement is provided which will automatically rotate the reticle in response to rotation of the combining glass to correct alignment of the sight with the gun with which it is associated.

The novel features characteristic of the present invention, as well as additional objects and advantages thereof, will be understood better when read in connection with the accompanying drawing in which.

Figure 1:
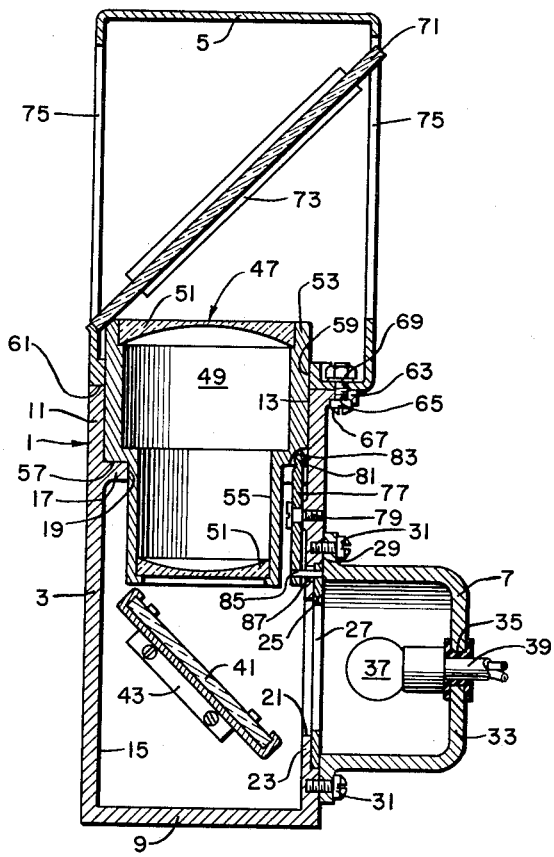
FIGURE 1 is a vertical, central section of a gun sight in accordance with the present invention.

Referring more particularly to the drawing, wherein similar reference characters are employed to designate corresponding parts throughout, the present invention is shown applied to a sight of the type useful with items of ordnance. In sights of this kind, it is necessary that the sight and the gun be oriented so that they will both look in the same direction and be aimed at a common object. In order to make minor adjustments thereby to compensate for lateral displacement of the reticle with respect to the object on which the gun is bore sighted, the sight is arranged so that it may be rotated about a vertical axis in order to correct the reticle image position. By doing this, the axis of the gun is aligned parallel with the axis of the sight. This may be accomplished in either one of two ways, namely: the entire sight may be rotated as a unit relative to the gun, or, at least the combining glass is rotated relative to the reticle image producing elements of the sight. The present invention is directed particularly to the second mentioned arrangement.

For purposes of illustration, the present invention is shown and described with respect to a single embodiment and applied to a sight of the reflex type utilizing a collimated image projected on a combining glass through which the observer sees the field of view with the reticle image superimposed thereon. In this particular arrangement, a housing 1 is provided which is divided into three parts. The first part 3 of the housing is utilized for the reticle image producing members and is intended for mounting on the gun or its support in a fixed position. The second part 5 of the housing is rotatably supported above the first part and contains the collimating and combining glass members. The third part 7 of the housing is utilized to provide a light source for the reticle image.

The first housing 3 comprises a hollow member of rectangular cross section adapted for mounting in an upright position. The lower end 9 of this member is closed. The upper end 11 thereof is provided with a circular opening 13. The inner walls 15 of the housing are provided with an inwardly extending shoulder 17 adjacent to the upper end 11. The inner edge 19 of the shoulder is arranged to provide a circular opening for a purpose to be explained later herein.

Adjacent to the lower end of the first housing, in one side thereof, there is provided an opening 21. The opening is counterbored on the exterior side of the housing to provide a shoulder 23. A disc 25 is disposed over the opening with its peripheral edge engaging the shoulder 23. The disc is provided with a discrete opening 27 for producing a reticle image.

The light housing 7 is a hollow member having one side open. The peripheral edges 29 of the open side are flanged outwardly for convenience in mounting on the first housing 3, as by bolts 31. The light housing is so disposed that the peripheral edges 29 are utilized to retain the reticle disc in the opening 21. Thus, the disc is freely disposed for rotation between the light housing peripheral edges and the shoulder 23. The closed side 33, opposite the open side of the light housing, is provided with a suitable opening 35 through which a light source 37 may be connected with electrical energy, as by wires 39.

A first surface mirror 41 is mounted within the first housing opposite the opening 21. The mirror is supported by any suitable means, such as brackets 43 attached to two opposite side walls of the housing. The mirror is oriented at a 45 degree angle with respect to the vertical axis of the housing so that it will reflect a reticle image 45 upwardly through the opening provided by the flange 17.

A collimator lens assembly 47 is provided which comprises a cylindrical housing 49 and a pair of collimating lenses 51. The housing is made with the upper portion 53 of larger diameter than the lower portion 55 in order to provide a shoulder 57 which will cooperate with the housing flange 17 thereby to support the lens assembly. The housing is purposely made so that the lower portion has a diameter substantially equal to the diameter of the opening provided by the flange 17 and the upper portion has a diameter substantially equal to the inner diameter of that part of the housing between the flange 17 and the open end 11. The assembly is freely rotatable with respect to the housing thereby providing a rotatable support for the combining lens housing 5. The optical construction and function of the assembly may be of a design well known to those skilled in the art and need not be herein described other than to state that it projects a collimated reticle image upwardly upon reflection by the mirror 41.

The combining glass housing 5 is a hollow framework having an opening 59 in the bottom through which a portion of the upper part 53 of the collimating assembly housing extends. The combining glass housing is attached to the collimating lens housing in any suitable manner so that the two may be rotated together. The bottom surface 61 of he housing is disposed to rest upon the upper end 11 of the first housing. An outwardly extending tab 63 is provided on the upper end of the first housing. The tab is provided with an opening 65 through which a bolt 67 is disposed. A corresponding arcuate shaped opening 69 is provided in the combining glass housing in registry with the tab opening so that the bolt 67 can extend therethrough. Thus, the combining glass housing can be rotated with respect to the first housing for adjustment upon release of the bolt and can be held in an adjusted position upon tightening the bolt.

A combining glass 71 is mounted within the housing 5 by any suitable means, such as the bracket 73, carried by opposite sides of the housing. The combining glass is disposed at a 45 degree angle with respect to the vertical axis of the housing. The combining glass is of a semi-transparent mirror type in which an observer can look through the combining glass to view a target area and at the same time see a reflected reticle image which is superimposed upon the field of view. Appropriately, the housing is cut away at opposite sides to provide openings 75 through which the field of view can be observed.

In order to compensate for recticle image cant from a vertical position, a compensating link 77 is provided between the collimator lens housing 49 and the reticle disc 25. The link comprises a bar which is journaled intermediate its ends on the inner wall of the housing, on the side thereof which supports the reticle disc. Any suitable pivot support may be provided such as the bolt 79. The upper end of the link is provided with a spherical tip 81 which is freely disposed within an opening 83 provided in the shoulder 57 of the collimator lens housing 49. The lower end of the link is provided with a pin 85 which extends through an opening 87 in the wall of the first housing. The pin is of a length to extend into an opening 89 provided in the reticle disc 25. The spherical tip 81 and the pin 85 are disposed relative to the pivotal axis 79 in such manner that rotation of the link will effect angular movement in a 1 to 1 ratio as between the collimating lens housing and the reticle disc.

Figure 2:
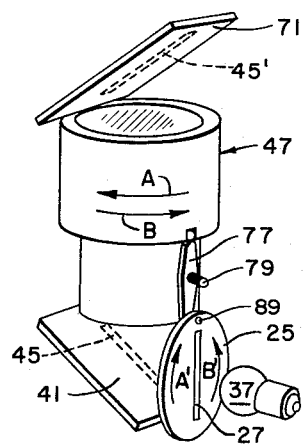
FIGURE 2 is a perspective view of the members associated with the link-work of the present invention.
Figure 3:
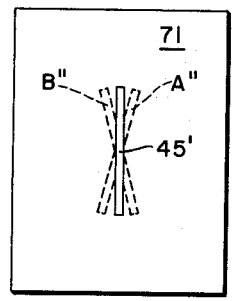
FIGURE 3 is a view representing the observer's view of the reticle image as seen in the combining glass.

From the foregoing description, the present invention may be understood to operate in the following manner. In order for the gun sight to function properly, it is essential that the sight and the gun be oriented upon the same object. Inasmuch as the reticle image may be displaced laterally from the object on which the gun is bore sighted, only minor adjustments need be made, in most cases, to make the sight and the gun coincide, the sight is arranged so that the combining glass 71 can be rotated independently of the reticle image producing elements. The combining glass is rotated in a horizontal plane sufficiently to bring the reticle image 45', as seen in the combining glass, in line with the distant target on which the gun has been bore sighted previously. However, it will be recognized that, if rotation is accomplished without providing the compensating link as a further means of correction, the reticle image would be inclined with respect to the field of view. Thus, in the embodiment shown and described herein, if the collimating lens assembly 47 and combining glass 71 are rotated in the direction of the arrow A shown in FIGURE 2, the reticle image would become inclined from its normal vertical position 45' to a position A", as shown in FIGURE 3 of the drawings. Similarly, if the assembly is rotated in the direction shown by the arrow B in FIGURE 2, the reticle image will appear inclined in the opposite direction, as shown by the image B" in FIGURE 3. Therefore, to automatically correct for this inclination of the image so that the reticle image 45' will remain vertical, the present invention proposes the use of the compensating link 77 between the collimating-combining glass assembly and the reticle disc 25. Thus, as the combining glass assembly is rotated in the direction of the arrow A, the link will rotate the reticle disc in the direction of the arrow A'. The linkage being established to effect angular movement on a 1 to 1 ratio, the reticle image seen in the combining glass will be found to remain in a vertical position. Likewise, as the assembly is rotated in the direction of the arrow B, the reticle disc will be rotated in the direction of the arrow B' and again the reticle image seen in the combining glass will remain vertical.

It will be recognized by persons skilled in the art that the present invention provides a highly efficient, relatively simple arrangement useful in aligning a gun sight with the gun it is associated with. The arrangement enables the sight to be quickly and easily brought into its correct position by rotating the combining glass and collimating assembly only while the sight body, lower mirror and lamp remain fixed. Bore sighting can be effected, therefore, without disturbing the reticle image by virtue of the automatic compensating linkwork.

Although there has been shown and described but a single embodiment of the present invention, it will be recognized easily by those persons skilled in the art that changes and modifications are possible within the purview of the inventive concepts. For example, the combining glass housing may be linked with the reticle disc without involving the collimating assembly. Other changes of similar scope will readily suggest themselves. Therefore, it is to be understood that the form of the invention shown and described herein be taken as a preferred example except insofar as is made necessary by the prior art and by the spirit of the appended claims.

What is claimed is:

1. An optical gun sight for viewing a target comprising a semi-transparent mirror supported obliquely to the line of sight of the viewer, reticle means supported in a position to superimpose a reticle image on said mirror, said mirror and said reticle means being mounted for rotation on their respective supports, and connecting means comprising a link having opposite ends thereof connected respectively with said mirror and said reticle means, said link being journaled for rotation interjacent the ends thereof, and being operable to effect angular movement between said mirror and said reticle means in a 1 to 1 ratio.

2. In an optical gun sight for viewing a target, the combination with a semi-transparent mirror mounted for rotation and supported obliquely to the line of sight of the viewer, and means for superimposing a reticle image upon said mirror, of means for interconnecting said mirror and said reticle means, said interconnecting means comprising a link rotatably supported between its ends in a manner to effect angular movement between said mirror and said reticle means in a 1 to 1 ratio, whereby said interconnecting means is operable to eliminate canting of said reticle image in response to rotation of said mirror.

3. An optical sight for viewing a target comprising a housing adapted for support in a fixed position, a semi-transparent mirror supported on said housing obliquely to the line of sight of a viewer, means including a reticle plate carried by said housing for projecting a reticle image in an upright position on said mirror, said plate being rotatably mounted on said housing, said mirror being rotatably mounted on said housing for adjustment of the reticle image laterally relative to the line of sight, and connecting means for said mirror and said reticle plate comprising a link mounted for rotation interjacent the ends thereof in a manner to effect angular movement between said mirror and said plate in a 1 to 1 ratio, whereby simultaneous movement is imparted to said plate in response to adjustment of said mirror thereby to correct the line of sight relative to said reticle image by maintaining said reticle image in an upright position at all times.

4. An optical sight for viewing a target comprising a housing adapted for support in a fixed position, a semi-transparent mirror supported on said housing obliquely to the line of sight of a viewer, means including a reticle plate carried by said housing for projecting a reticle image in an upright position on said mirror, said plate being rotatably mounted on said housing, said mirror being rotatably mounted on said housing for adjustment of the reticle image laterally relative to the line of sight, and connecting means disposed between said mirror and said plate comprising a link mounted for rotation interjacent the ends thereof, the ends of said link being engaged respectively with said mirror and said plate for imparting simultaneous movement to said plate in response to adjustment of said mirror for correcting the line of sight relative to said image, said connecting means being operable to maintain said image in an upright position at all times.

References Cited in the file of this patent

UNITED STATES PATENTS

| | | |
|---|---|---|
| 2,023,838 | Kuppenbender et al. | Dec. 10, 1935 |
| 2,191,027 | Ort | Feb. 20, 1940 |
| 2,458,831 | Cady | Jan. 11, 1949 |
| 2,486,225 | Townsley | Oct. 25, 1949 |